United States Patent [19]

van den Berg

[11] 4,418,441

[45] Dec. 6, 1983

[54] SPACER FOR ROTATABLY CONNECTING WIPER BLADE PARTS

[75] Inventor: Johan H. van den Berg, Hasselt, Belgium

[73] Assignee: Champion Spark Plug Europe S.A., Binche, Belgium

[21] Appl. No.: 311,315

[22] Filed: Oct. 14, 1981

[30] Foreign Application Priority Data

Oct. 15, 1980 [FR] France ............................... 80 22030

[51] Int. Cl.³ ................................................ B60S 1/38
[52] U.S. Cl. ................................ 15/250.42; 15/250.32
[58] Field of Search ........................ 15/250.36–250.42, 15/250.32

[56] References Cited

U.S. PATENT DOCUMENTS 3,408,679  11/1968  Deutscher et al. ............. 15/250.42
4,286,351  9/1981  Mower et al. .................... 15/250.42

FOREIGN PATENT DOCUMENTS 1089210  11/1967  United Kingdom ............ 15/250.42
1183446  3/1970  United Kingdom ............ 15/250.42
2041730  9/1980  United Kingdom ............ 15/250.42

*Primary Examiner*—Peter Feldman
*Attorney, Agent, or Firm*—Wood, Dalton, Phillips, Mason & Rowe

[57] ABSTRACT

In a wiper blade assembly, a spacer is provided for rotatably connecting two yokes of a wiper blade. The spacer has substantially the form of an inverted U provided with first members securing the spacer rigidly to a first yoke and provided with second members rotatably securing the spacer to a second yoke. The first members are rigidly secured to the web of the inverted U with the second members rigidly secured to the two flanges of said inverted U.

12 Claims, 11 Drawing Figures

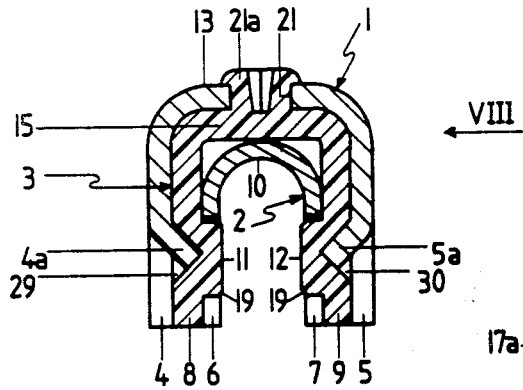
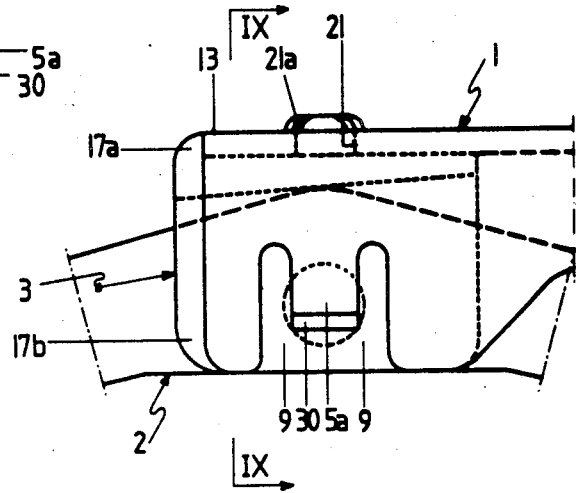
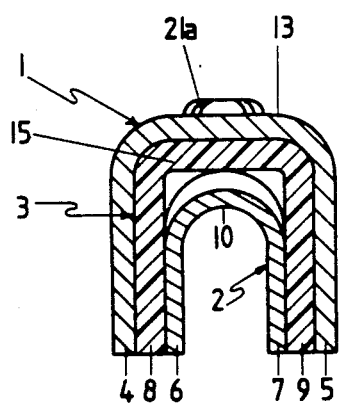
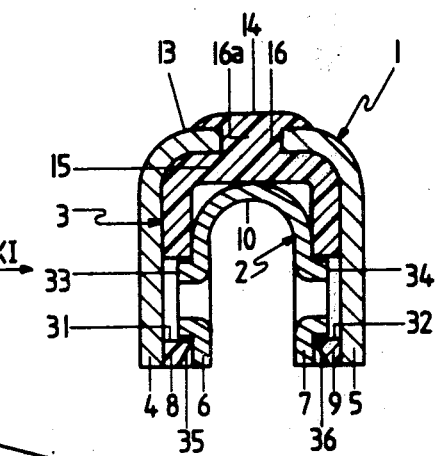
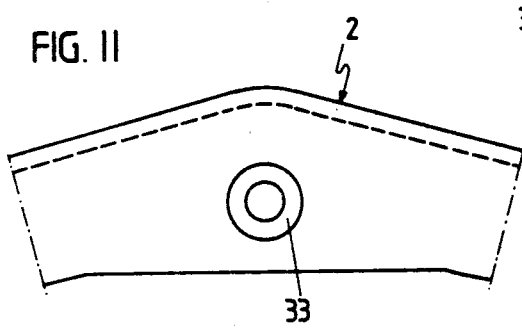

SPACER FOR ROTATABLY CONNECTING WIPER BLADE PARTS

DESCRIPTION

Technical Field

The present invention relates to a spacer for rotatably connecting two yokes of a wiper blade assembly, said spacer having substantially the form of an inverted U provided with first means securing it rigidly to a first yoke and provided with second means rotatably securing it to a second yoke. Such spacers are, for example, used on the wiper blade assemblies of motor vehicles.

Background Art

Spacers of the above described type are known in prior art and more especially through British Patent application 2,038,167 wherein a U-shaped spacer is disclosed which comprises two short pins on both of its flanges, one projecting towards the inside and the other projecting towards the outside. The two pins projecting towards the inside form an articulation between the two yokes of the wiper blade and the two pins projecting towards the outside are held in two corresponding circular openings provided in the two flanges of the largest of the two yokes, which both have a substantially U-shaped cross-section. The form and the size of this spacer is such that it cannot move with respect to the largest of the two yokes. On the contrary, the smaller yoke may slightly rotate with respect to the spacer and consequently with respect to the larger yoke.

A disadvantage of the spacer disclosed in said British patent application is the following. Once the spacer has been mounted on the smaller yoke, the larger yoke is mounted on the spacer with its two flanges obliquely apart. These two flanges are then pushed towards the corresponding flanges of the spacer and the two pins of the spacer which project outwardly enter into the corresponding circular openings provided in the two flanges of the larger yoke. If the flanges of the larger yoke are pushed towards the flanges of the spacer only up to the point where they touch the flanges of the spacer, said flanges of the larger yoke will, because of their own resiliency, have the tendency to move apart again and consequently to at least partly disengage said circular openings from the outwardly directed pins of the spacer. There is therefore a serious risk that when a tractive force is applied to the wiper blade, the pivot connection, or articulation, will fail.

On the other hand, if, when mounting the larger yoke on the spacer, the two flanges of said larger yoke are pressed too firmly against the spacer, not only the spacer, but also the smaller yoke risks to be damaged and the resulting deformations might prevent the correct working of the connection.

The present invention is directed to overcoming one or more of the problems as set forth above.

Disclosure Of The Invention

These drawbacks are avoided in the spacer according to the invention, which is characterized by the fact that said first means are rigidly secured to the web of said inverted U and that said second means are rigidly secured to the two flanges of said inverted U.

According to a first embodiment of the invention said first means comprise a rivet of which the central portion, of circular or of any other cross-section, passes through a corresponding opening provided on top of the first yoke.

According to a second embodiment said first means comprise a snap-on device capable of snapping into a corresponding opening provided on top of the first yoke.

Brief Description Of The Drawings

Other features of the invention will be better understood when reading the following description of a certain number of embodiments in conjunction with the accompanying drawings, wherein:

FIG. 7 is a sectional view similar to the one of FIG. 4, but showing a third embodiment of the invention;

FIG. 8 is a view along arrow VIII of FIG. 7;

FIG. 9 is a sectional view along line IX—IX of FIG. 8;

FIG. 10 is a sectional view similar to the one of FIG. 2, but showing a fourth embodiment of the invention; and FIG. 11 is a view along arrow XI of the second yoke of FIG. 10.

Best Mode For Carrying Out The Invention

Figure 1:
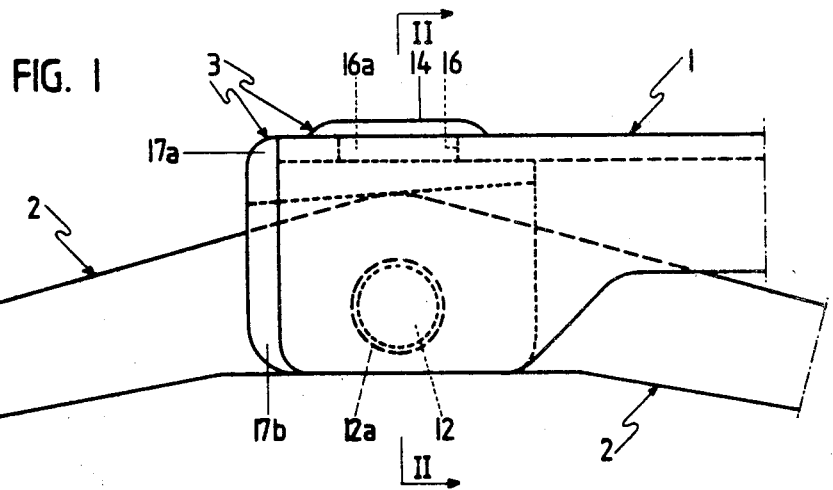
FIG. 1 is a lateral view of a portion of a wiper blade.
Figure 2:
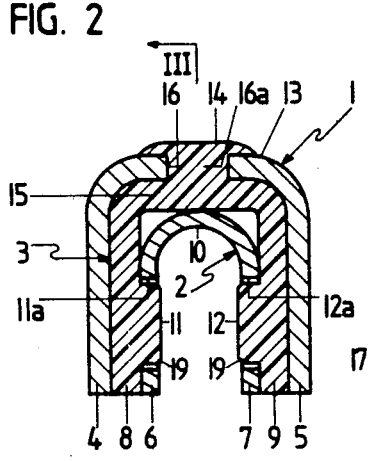
FIG. 2 is a sectional view along line 11—11 of FIG. 1, showing a first embodiment of the invention.

FIG. 1 shows one of the pivot connections of a wiper blade with the spacer 3 mounted between one of the extremities of a first yoke 1 and the central portion of a second yoke 2. The two yokes are made of flat steel and are substantially U-shaped (FIG. 2). It is to be noted that the spacer 3 comprises a U-shaped shouldering 17a, 17b of which the horizontal top portion 17a and the two vertical portions 17b cover the U-shaped edge of the extremity of the yoke 1.

Figure 3:
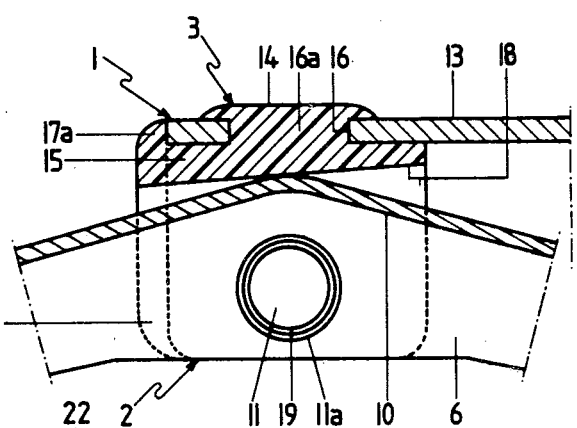
FIG. 3 is a sectional view along line 111—111 of FIG. 2.

A first embodiment of the spacer according to the invention is shown on FIGS. 1, 2 and 3. The U-shaped spacer 3 comprises: two flanges 8, 9, a web 15, a rivet 16a, a rivet head 14 as well as two cylindrical pivots 11, 12 slightly chamferred on their internal circular edges 19. The rivet 16a is an integral part of the web 15 and passes through the opening 16 in the web 13 of the yoke 1, the head 14 of said rivet 16a being flanged onto the web 13 of the yoke 1. The spacer 3 is thus rigidly fixed to the yoke 1 and moreover its external form exactly fits into the internal form of said yoke 1. The two cylindrical pivots 11, 12 of the spacer 3 are an integral part of the flanges 8, 9 and are seated in the corresponding openings 11a, 12a provided in the flanges 6, 7 of the yoke 2.

Because of the fact that the inner surface 18 (FIG. 3) of the web 15 is inclined with respect to the web 13 of the yoke 1 and because of the fact that the web 10 of the yoke 2 is slightly angular (FIG. 3) above the two pivots 11, 12, said yoke 2 may slightly rotate around said two pivots 11, 12.

For mounting the spacer 3 onto the two yokes 1, 2 one proceeds as follows. The spacer is first pushed downwards onto the yoke 2 until the two cylindrical pivots 11, 12 snap into the circular openings 11a, 12a.

For this first mounting operation it is therefore necessary that said spacer 3 is made out of a resilient material. The yoke 1 is then mounted on the spacer 3 by having its flanges 4, 5 slide downwards over the flanges 8, 9 of the spacer 3 until the head 14 of the rivet 16a projects from the opening 16 of the web 13 of the yoke 1. The head 14 of the rivet 16a is then flanged onto the web 13 of the yoke 1.

Figure 4:
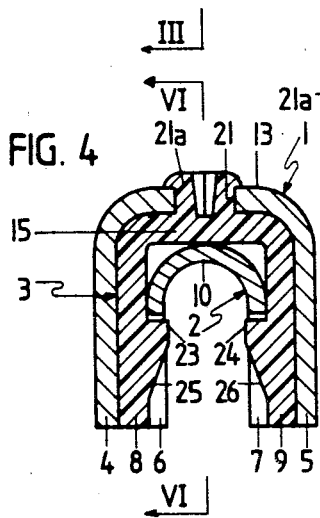
FIG. 4 is a sectional view similar to the one of FIG. 2, but showing a second embodiment of the invention.
Figure 5:
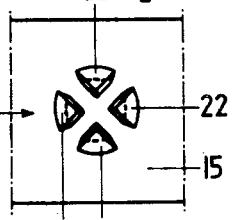
FIG. 5 is a partial top view of FIG. 4.
Figure 6:
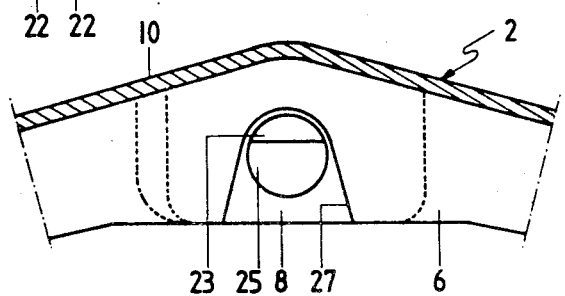
FIG. 6 is a partial sectional view along line VI—VI of FIG. 4.

A second embodiment of the spacer according to the invention is shown on FIGS. 4, 5 and 6. The working principle and the way to mount the spacer 3 onto the two yokes 1, 2 are the same as before, only a few constructive details having been changed. Thus the rivet 16a and its head 14 of the first embodiment are replaced by a snap-on device 21a which passes through the opening 21 in the web 13 of the yoke 1 and which comprises a certain number of resilient hooks 22. It is to be noted that the cross-section of said snapping device 21a is not necessarily of a circular form: the section may be square or rectangular, the same being true for the cross-section of the rivet 16a of the first embodiment.

Other changes or modifications may be made: the pivots 23, 24 (FIG. 4) may be provided with an inclined internal surface 25, 26 for facilitating the mounting of the spacer 3 onto the yoke 2 and instead of the circular openings 11a, 12a (FIG. 2) the flanges 6, 7 of the yoke 2 may be provided with open seats 27 (FIG. 6).

A third embodiment of the invention is shown in FIGS. 7, 8 and 9. In this embodiment, the rigid connection between the yoke 1 and the spacer 3 has been reinforced by the lugs 4a, 5a which grip in corresponding recesses 29, 30 provided in the external surface of the two flanges 8, 9 of said spacer 3. It is to be noted that in this embodiment the snapping device 21a is not compulsory, but it can be used for centering the different parts when mounting the yoke 1 on the spacer 3. In this last mentioned case said snapping device 21a may be reduced to a simple stud or detent.

A fourth embodiment of the spacer according to the invention is shown on FIGS. 10 and 11. In this embodiment the second means of the flanges 8, 9 of the spacer 3 do not have the form of two inwardly projecting pivots, but of two cylindrical openings 31, 32 wherein project corresponding circular lugs 33, 34 stamped into the two flanges 6, 7 of the yoke 2. In order to facilitate the mounting of the spacer 3 onto the yoke 2, an inclined surface 35, 36 is provided in the lower internal portion of the spacer 3, beneath said cylindrical openings 31, 32.

Several embodiments of a new spacer for rotatably connecting two yokes of a wiper blade have thus been described. It is however to be understood that other changes and/or modifications may be made without departing from the scope of the invention as defined in the appended claims. The yoke 2 could, for example, be completely made out of an appropriate plastic material and have a solid section at the pivot connection.

What is claimed is:

1. A spacer (3) for rotatably connecting a first yoke (1) to a second yoke (2) of a wiper blade assembly, the first yoke (1) having at the outer end portion substantially the form of an inverted U with the flanges (4, 5) joined by a web (13), said spacer (3) having substantially the form of an inverted U with a pair of flanges (8, 9) joined by a web (15), the spacer (3) being provided with first means (16a, 14, 21a) for securing the spacer (3) to the first yoke (1) and provided with second means (11, 12, 23, 24, 31, 32) for rotatably securing the spacer to the second yoke (2), characterized in that said first means (16a, 14, 21a) are integrally formed on the web (15) of said inverted U of the spacer and project in a direction opposite to the direction of the flanges (8, 9) of the spacer, said first means are secured to the web (13) of the first yoke (1), said second means (11, 12, 23, 24, 31, 32) are integrally formed on the two flanges (8, 9) of the inverted U of the spacer and project toward each other, said second means are pivotally secured to said second yoke (2), the flanges (4, 5) of the first yoke surround the flanges (8, 9) of the spacer for holding the second means (11, 12, 23, 24, 31, 32) of the spacer (3) assembled with the second yoke (2).

2. A spacer (3) according to claim 1 characterized in that said first means comprise a rivet (16a), of circular or of any other cross-section, passing through a corresponding opening (16) provided in the web (13) of said first yoke (1).

3. A spacer (3) according to claim 1 characterized in that said first means comprise a snap-on device (21a) capable of snapping into a corresponding opening (21) provided in the web (13) of said first yoke (1).

4. A spacer (3) according to claim 3, characterized in that the snap-on device (21a), of circular or of any other cross-section, comprises several resilient hooks (22) resting on the external surface of the web (13) of said first yoke (1).

5. A spacer (3) according to claim 1, characterized in that said second means comprise two cylindrical (11, 12) or semi-cylindrical (23, 24) pivots.

6. A spacer (3) according to claim 5, characterized in that said two pivots (11, 12, 23, 24) cooperate with two corresponding recesses provided in the two flanges (6, 7) said second yoke.

7. A spacer (3) according to claim 5 wherein the second yoke (2) has substantially the form of an inverted U, characterized in that said two pivots (11, 12, 23, 24) cooperate with two corresponding openings (11a, 12, 27) provided in the two flanges (6, 7) of said second yoke (2) and said second yoke (2) is situated between the two flanges (8, 9) of the spacer (3).

8. A spacer (3) according to one of the claims 2 through 7, characterized in that the two flanges (4, 5) of the first yoke (1) are both provided with a lug (4a, 5a) which projects into a corresponding recess (29, 30) provided in the external surfaces of the two flanges (8, 9) of the spacer (3) in front of said cylindrical (11, 12) or semi-cylindrical (23, 24) pivots, the engagement between the lug (40, 50) and recess (29, 30) reinforcing the connection between the yoke (1) and spacer (3).

9. A spacer (3) according to claims 1 characterized in that said second means comprise two cylindrical openings (31, 32).

10. A spacer (3) according to claim 9, characterized in that said two cylindrical openings (31, 32) cooperate with two corresponding pivots provided on the two flanges of said second yoke.

11. A spacer (3) according to claim 9 wherein the cross-section of the second yoke has substantially the form of an inverted U, characterized in that said two cylindrical openings (31, 32) cooperate with two corresponding lugs (33, 34) stamped out of the material of the two flanges (6, 7) of said second yoke (2).

12. A spacer (3) according to one of the claims 1 through 7, 10 and 11, characterized in that the spacer is made in one piece, for example, out of an appropriate plastic material.

* * * * *